United States Patent [19]

Merino

[11] 3,742,908
[45] July 3, 1973

[54] ANIMAL HABITAT
[75] Inventor: Dennis H. Merino, Harbor City, Calif.
[73] Assignee: Mattel, Inc., Hawthorne, Calif.
[22] Filed: Apr. 30, 1971
[21] Appl. No.: 138,934

[52] U.S. Cl. .................................... 119/15, 119/1
[51] Int. Cl. .............................................. A01k 1/00
[58] Field of Search ..................... 119/1, 15, 29, 17, 119/18, 19

[56] References Cited
UNITED STATES PATENTS

| | | | |
|---|---|---|---|
| 3,367,308 | 2/1968 | Quattrone et al. | 119/15 |
| 2,358,588 | 9/1944 | Palmer | 119/15 |
| 2,795,208 | 6/1957 | Rasmussen | 119/15 |
| 2,324,339 | 7/1943 | VanBussum | 119/15 |
| 3,464,388 | 9/1969 | Stout | 119/15 |
| 3,260,236 | 7/1966 | Jones | 119/1 |

Primary Examiner—Aldrich F. Medbery
Attorney—Friedman & Goodman

[57] ABSTRACT

An animal habitat comprising at least one housing for confining an animal in captivity and for permitting an animal to perform natural bodily functions while in captivity. Transparent tubular members are provided for simulating natural burrowed tunnel array extending in ascending-descending relation as are coupling members for permitting selectively the assembling, disassembling and rearranging of the transparent tubular members universally. The transparent tubular members which extend in ascending-descending relation are internally provided with climbing elements for enabling an animal to climb axially therealong. The climbing elements may be generally of helical extent and of substantially lesser transverse dimension than that of the transparent tubular members wherein the climbing elements are disposed.

19 Claims, 8 Drawing Figures

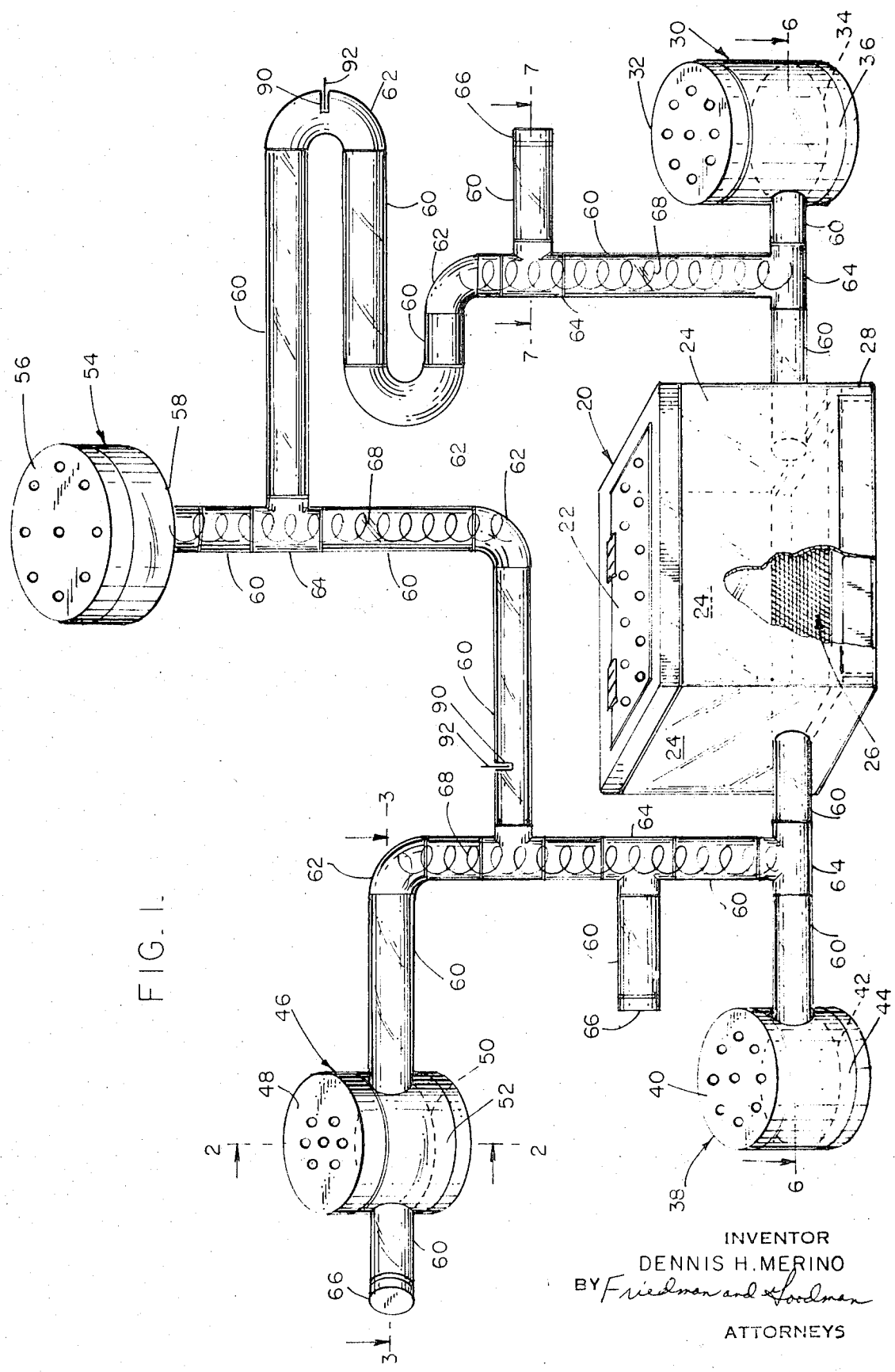

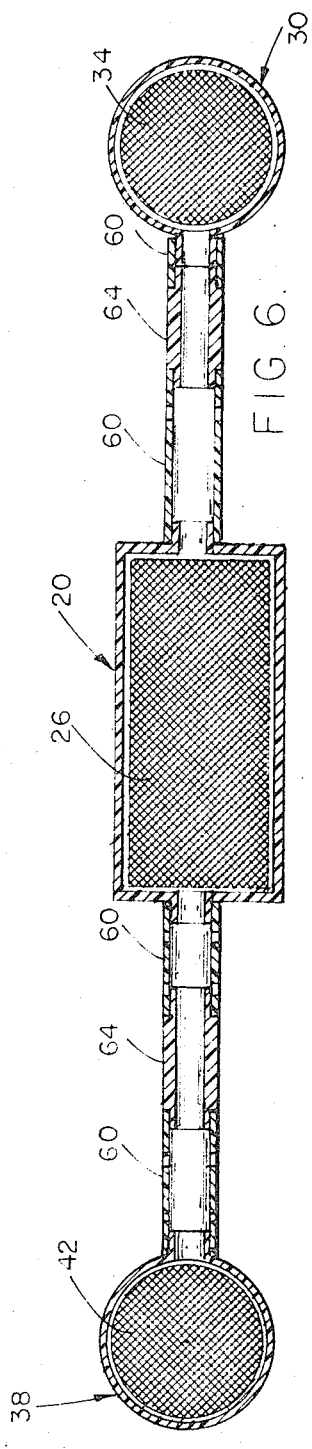

3,742,908

ANIMAL HABITAT

BACKGROUND OF THE INVENTION

The present invention relates generally to means for confining pets, and more particularly to an animal habitat for observing rodents and the like in a habitat most effectively simulating a natural environment.

Many animals have, in a sense, been domesticated and thus are characterized as pets. However, certain of these animals, such as the hamster, must be confined or retained captive to obviate any possibility of their escape because of their "wild" nature and their tendency to seek ultimate freedom persistently notwithstanding their partial domestication. Generally, the means for confining pets is effected in a housing which permits the pet or hamster to eat, sleep, excrete waste material and exercise in an extremely small area and thus fails completely to serve as a natural environment. The importance of providing a natural environment for the captive hamster cannot be overstated, since the hamster like all animals, tends to become frustrated, irritated and generally inactive after long periods of confinement within a small area especially in those instances where the hamster is confined in the small area with other hamsters. Thus, the enjoyment derived from observing the hamster is obviously reduced to a great extent when the hamster remains generally lifeless and unmotivated due to excessive and unwarrented confinement.

Generally, it is the nature for most animals of the rodent variety, as it is for the hamster, when free in a truly natural environment to eat in one location, sleep in another location, excrete waste material in still another location and exercise as by climbing and burrowing through tunnels in the ground. Thus, it is clear that when the rodent or hamster is confined in a small area and is compelled to perform all his natural bodily functions within the small area, the hamster will become generally listless and a thoroughly unenjoyable pet to retain.

Many attempts have been made at providing the hobbyist with various assemblies for permitting the hamster to exercise, and these usually require the removal of the hamster from its housing or cage of confinement and the placing of the hamster within these exercising assemblies. The disadvantage with regard to removing the hamster from its cage is the fact that the hamster often becomes completely free and is difficult to capture once again. Furthermore, these exercising assemblies have a further disadvantage associated with them in that they do not adequately serve to most effectively simulate a natural environment for the hamster.

In this respect, the hamster may be subjected to a maze of predetermined orientation and of generally planar extent and upon becoming familiar with the proper path for traversing the maze eventually becomes disinterested in the latter. Because of the planar extent of the maze, the maze furthermore does not permit the hamster to traverse a channel simulating a natural burrowed tunnel, an inherent tendency extremely common and natural for the hamster, and thus the hamster is again subjected to an artificial environment that does not fully and most effectively satisfy his needs.

Another disadvantage associated with the requirement for removing a hamster from its housing or cage of confinement and placing the hamster in a location for exercise or the like is the fact that hamsters have a tendency for climbing and if completely free, will climb to dangerous heights. In this respect, a dangerous height for a hamster is that which exceeds four feet, as is commonly appreciated by those familiar with hamster activity, and should the hamster fall from a height exceeding four feet, the hamster will become paralized or die immediately from a fall of this nature. Should this occur, there is nothing left for the hobbyist to do except to destroy the rodent, should he become paralized, in the most humanely possible manner available, a difficult situation under any circumstance. Obviously, there is a void in the art of relative significance.

SUMMARY OF THE INVENTION

Accordingly, it is an object of the present invention to provide an animal habitat for fully confining an animal such as a rodent or hamster.

It is another object of the present invention to provide an animal habitat which permits an animal such as a rodent or hamster to wander and explore under conditions most effectively simulating a natural environment.

It is still another object of the present invention to provide an animal habitat which is at least partially transparent to permit ready observation of the animal or animals so confined.

It is another object of the present invention to provide an animal habitat which permits a confined animal, such as a hamster, to perform basic bodily functions such as eating, drinking, sleeping, excreting waste materials and exercising all in spaced locations relative to one another in a manner as the animal would normally do in the "wild".

It is still a further object of the present invention to provide an animal habitat for confining animals which may be assembled, disassembled and rearranged in universal orientation.

It is another object of the present invention to provide an animal habitat for confining animals, such as rodents, hamsters and the like, which permits the confined animal to climb in ascending channels which most effectively simulate natural burrowed tunnel array.

It is still a further object of the present invention to provide means for selectively separating the animal habitat into a plurality of isolated regions to isolate animals therein from one another and to permit the hobbyist to more easily manually capture an animal in the habitat.

To this end, the present invention relates to an animal habitat comprising at least one housing for confining an animal in captivity and for permitting an animal to perform natural bodily functions while in captivity. Transparent tubular members are provided for simulating natural burrowed tunnel array extending in ascending-descending relation as are coupling members for permitting selectively the assembling, disassembling and rearranging of the transparent tubular members universally. The transparent tubular members which extend in ascending-descending relation are internally provided with climbing elements for enabling an animal to climb axially therealong. The climbing elements may be generally of helical extent and of substantially lesser transverse dimension than that of the transparent tubular members wherein the climbing elements are disposed.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which:

FIG. 1 is a generally perspective view of the animal habitat according to the present invention illustrating the various retention housings associated with one another in communicating relation through the intermediary of transparent tubular members;

FIG. 2 illustrates a cross-sectional elevational fragmentary view taken along the line 2—2 in FIG. 1 of one retention housing according to the present invention;

FIG. 3 illustrates a cross-sectional view of the housing of FIG. 2 taken along the line 3—3 in FIG. 1;

FIG. 4 illustrates an elevational cross-sectional view of a further housing and its communicating relation with fragments of tubular members in accordance with the present invention;

FIG. 5 illustrates a cross-sectional view of a vertically extending tubular member having a helically extending element provided therein to enable an animal to climb vertically therein;

FIG. 6 illustrates a cross-sectional view taken along the line 6—6 in FIG. 1 of the communicating relation of three further housings in accordance with the present invention;

FIG. 7 illustrates a cross-sectional view taken along the line 7—7 in FIG. 1 of a tubular member having a plugged extremity detachably associated therewith; and FIG. 8 illustrates an elevational cross-sectional view of the right-most housing as illustrated in FIG. 1.

DETAILED DESCRIPTION OF THE INVENTION

Referring now to the drawings and more particularly to FIG. 1 thereof, there is illustrated an animal habitat comprising a central housing or cage 20 of generally rectangular configuration or the like for confining a rodent such as a hamster or the like. The central housing 20 may be employed for confining either one or a plurality of hamsters and is sufficiently large so that the hamsters may move around freely and either rest or sleep therein. The central housing 20 is provided with a perforated pivotally supported lid 22 and transparent panels 24 to permit observation of the hamsters therein. At the lower-most portion of the central housing 20, there is provided a grid or screened base plate 26 upon which the hamsters may move about and below which is provided a removable tray 28 for receiving animal droppings or the like if any.

To the right of the central housing 20, as illustrated in FIG. 1, there is provided a transparent housing 30 or a food depository having associated therewith a removable perforated lid 32, a screened base plate 34 at the lower portion thereof and a removable tray 36 for receiving food droppings or the like if any. The removable perforated lid 32 is associated with the transparent housing 30 in press-fit relation so that food may easily be deposited therein as is the tray 36 in a manner as illustrated in FIG. 8.

At the left of the central housing 20, as illustrated in FIG. 1, there is provided a transparent housing 38 for permitting a hamster to excrete waste material. The transparent housing 38 is provided with a removable perforated lid 40 permitting access into the housing 38 and a screened base plate 42 upon which a hamster may move about, below which screened base plate 42 there is provided a removable tray 44 for receiving animal droppings or the like if any.

Also provided to the left of the central housing 20 and above the transparent housing 38 as illustrated in FIG. 1, is a transparent exercising chamber 46 having therein a treadmill (not shown because of its conventional nature) or the like. The transparent exercising chamber 46 is provided with a removable perforated lid 48 permitting access into the exercising chamber 46 and a screened base plate 50 upon which a hamster may move about. A removable tray 52 is also provided at the lower portion of the exercising chamber 46 below the screened base plate 50 for receiving animal droppings or the like if any.

A transparent hamster observatory 54 for permitting a hamster to observe his surroundings is provided generally above the central housing 20, as illustrated in FIG. 1, and includes a removable perforated lid 56 at its upper-most portion and an inner base or platform 58 onto which a hamster may climb as illustrated most clearly in FIG. 4.

As illustrated in FIGS. 2, 3, 4, 6 and 8, the transparent housings 30, 38, 46 and 54 are generally alike both in size and facility more or less and permit a hamster to perform natural bodily functions such as eating, sleeping, excreting waste material and exercising, all in different locations in a manner as the hamster would normally do selectively if entirely free and in the "wilds".

As illustrated in FIG. 1, each of the housings communicate with one another through the intermediary of hollow plastic-like generally rigid tubular members 60, the latter which are interconnected to one another such as by means of hollow elbows 62 (of 180°, 90° and 45° bend, the latter not illustrated) and hollow tees 64 all of which are associated with one another in press-fit relation. Also illustrated in FIG. 1 is that selected of these tubular members 60 are constituted as blind passageways terminating in an endmost removable plug 66. The purpose of these blind passageways is to permit additional tubular members 60 to be connected thereto upon removal of the plugs 66 therefrom.

The tubular members 60 are generally of sufficient diameter to permit a hamster or the like to traverse therethrough in a manner that the hamster would normally do if in the "wilds". In this respect, a hamster has a tendency to burrow into the ground and form tunnels which intercommunicate with one another in selective universal fashion. Thus, the tubular members 60 have a diameter and cross-sectional area which most realistically approximates the size of a tunnel that would be naturally burrowed by a hamster, i.e., just larger than the cross-sectional extent of the hamster itself or in effect approximately two to four inches.

As illustrated in FIG. 1 and most clearly in FIG. 5, certain of the tubular members 60 which have a vertical extent are provided internally therein with climbing elements 68 of helical extent such as springs or the like which are sufficiently rigid for withstanding the weight of a hamster without substantial deformation. The purpose of the climbing elements 68 is to permit a hamster to traverse upwardly along the vertical tubular members 60, a feat that the hamster itself could not ordinarily do within the tubular member 60 because of the smooth surfaces thereof and the elongate length thereof which is substantially greater than that of the height of a hamster.

Although the climbing elements or springs 68 have been characterized as being sufficiently rigid for withstanding the weight of a hamster without substantial deformation, it should be equally clear that resilient springs may be utilized as well and fixedly positioned internally of these vertical tubular members 60 such that the opposite end portions of the springs 68 are detachably yet fixedly connectable to the wall of the tubular member 60 as by conventional means to thereby permit a hamster to climb therealong.

It should be furthermore equally clear that although springs are utilized for permitting a hamster to climb along the vertically extending tubular members 60, the tubular members 60 may be perforated or provided with internal grooves, or porjections and the like, or in fact with a natural or synthetic material of either tubular or flat extent having a network of enlarged openings of so-called mesh extent to permit a hamster to grasp the latter and climb axially upwardly along the vertically extending tubular members 60.

Although as illustrated in FIG. 1, the tubular members 60 extend both in vertical and horizontal directions, it should be clear that the tubular members 60 may be inclined relative to one another at various angles which may be readily selected by the hobbyist who assembles the animal habitat according to the present invention and thus, the tubular members 60 and the various transparent housings may be positioned relative to one another in universal fashion. Obviously other connecting members such as the hollow elbows 62 and hollow tees 64 may be provided of other predetermined configuration to permit the interconnection and assembly of the elements of the animal habitat according to the present invention in universal fashion. In each instance, however, whenever the grade or incline of a particular tubular member 60 is excessive, there should be provided a climbing element 68 or the like to permit the hamster to readily traverse the inclined tubular member 60.

It is significant that tubular members 60 are rigid and, therefore, when assembled will support each of the housings associated therewith in vertical or elevated positions relative to one another without any necessity whatsoever for additional or auxiliary securing or retaining members which otherwise detract from the appearance of the habitat, increase the cost of manufacture and increase the complexity of the assembly.

The animal habitat pursuant to the present invention may be utilized upon assembly simply by placing a hamster or hamsters within the central housing 20 through the access opening covered by the displaceable lid 22. The hamster will then wander and explore the entire animal habitat and traverse through the tubular members 60 into each of the transparent housings associated therewith and thus be confined in domesticated fashion yet in a habitat which most effectively simulates a natural environment for the hamster.

Generally, the hamster will excrete waste material at a point most remote from those locations where the hamster eats and sleeps. Thus, in order to enhance the excretion process and the simulation of a natural environment for the hamster, the transparent housing 38 is interconnected to the central housing 20 at a greater distance therefrom than that distance at at which the transparent housing 30 or food depository is positioned relative to the central housing 20. Thus, the hamster will function most naturally and will traverse through the completely rearrangeable animal habitat through each of the tubular members 60 in a manner that he would normally when burrowing through the ground.

As those, who understand the nature of hamsters, are aware, hamsters generally will fight amongst themselves and, therefore, they must be separated from one another. To this end at least certain of the tubular members 60, as illustrated in FIG. 1, are provided with slitted portions or receptacles 90 in which is displaceable a disc 92 or similar element for separating the habitat into a number of isolated regions and thereby the hamsters from one another should the necessity arise. Furthermore, the discs 92 may be used to isolate the hamster so that it may be more easily manually captured.

In either instance, the provision of the receptacles 90 and isolating means or discs 92 is clearly a beneficial and important feature. It should be clear that other forms of isolating means for dividing the tubular members into two isolated portions are considered such as gates and the like and may be readily incorporated as those skilled in the art readily appreciate.

Thus, the hobbyist and the hamster both benefit from the animal habitat pursuant to the present invention since in fact that hamster is provided with a "natural environment" and the hobbyist is provided with a hamster that is fully satisfied and one that is fun to retain. The hamster, therefore, can be trained to do numerous tricks safely within a fully confined environment that is in large measure transparent for hamster observation.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. An animal habitat which is adapted to be assembled, rearranged and disassembled selectively, said habitat comprising a plurality of transparent hollow members, means for detachably connecting said hollow members in communicating tunnel relation with one another, housing means including access means communicating with said hollow members for permitting an animal to enter into and exit from tunnel defined by said hollow members, at least one of said hollow members being provided with an elevated extent portion relative to the others of said hollow members, said at least one hollow member including climbing means extending internally therein for permitting and assisting an animal to climb upwardly and downwardly axially along said at least one hollow member.

2. An animal habitat as claimed in claim 1, wherein said hollow members are sufficiently rigid for supporting one another in associated elevated positions respectively in absence of auxiliary supporting members.

3. An animal habitat as claimed in claim 1, wherein said hollow members are generally tubular.

4. An animal habitat as claimed in claim 3, wherein said hollow members are generally circular in cross-section.

5. An animal habitat as claimed in claim 1, wherein said access means includes means defining a chamber of substantially greater cross-sectional area than that of said hollow members for confining an animal in communication with said hollow members.

6. An animal habitat as claimed in claim 1, including means for connecting said at least one hollow member to a further said hollow member such that the latter hollow members extend in mutually perpendicular relation with one another.

7. An animal habitat as claimed in claim 1, wherein said climbing means includes a helical member extending axially in the latter said at least one hollow member, said helical member having a transverse extent portion which is sub-stantially less than that of the latter said hollow member.

8. An animal habitat as claimed in claim 7, wherein said helical member is constituted as a resilient spring resting freely in the latter said at least one hollow member.

9. An animal habitat as claimed in claim 1, including isolating means displaceable relative to said tunnel for isolating an animal in one region of the habitat.

10. An animal habitat as calim in claim 9, wherein said isolating means includes a displaceable member, one of said hollow members including means for defining a receptacle extending generally laterally thereof for receiving said displaceable member.

11. An animal habitat as claimed in claim 10, wherein said receptacle is constituted as a slit extending transversely of the latter said one hollow member, said displacable member being constituted as a plate insertable into said slit dividing the latter said one hollow member into two isolated protions.

12. An animal habitat as claimed in claim 1, wherein said access means includes means for defining a plurality of chambers separated from one another in communicating relation respectively with said hollow members, at least one of said chambers being constituted selectively by an animal as that for disposing excrement, at least another of said chambers being constituted as a food depository communicating with external environment and at least still another of said chambers including exercising means for use by an animal.

13. An animal habitat as claimed in claim 12, wherein said exercising means includes a pivotally supported treadwheel generator.

14. An animal habitat as claimed in claim 12, including a vent stack communicating with said hollow members for enhancing supply of air to the habitat.

15. An animal habitat as claimed in claim 12, wherein at least one of said chambers includes a raised platform extending horizontally therein and means for permitting an animal to climb upwardly to and downwardly away from said platform.

16. An animal habitat as claimed in claim 12, wherein at least one of said chambers is elevated relative to the others of said chambers.

17. An animal habitat comprising housing means for confining an animal in captivity, said housing means being provided with means for permitting an animal to perform natural bodily functions while in captivity, said housing means including transparent channel means for simulating natural burrowed tunnel array extending in ascending-descending relation, means for selectively assembling, disassembling and rearranging said channel means universally, said channel means including climbing means for enabling an animal to climb axially along ascending-descending extent of said channel means, said climbing means being of helical extent and of sub-stantially lesser transverse dimension than that of said channel means.

18. An animal habitat as claimed in claim 17, wherein said channel means includes members of generally tubular extent.

19. An animal habitat as claimed in claim 17, wherein said transparent channel means is sufficiently rigid for supporting each said means of said habitat in elevated positions respectively relative to one another in the absence of auxiliary supporting members.

* * * * *